United States Patent [19]
Hancock et al.

[11] Patent Number: 5,765,779
[45] Date of Patent: Jun. 16, 1998

[54] ICE PROTECTION DEVICE

[75] Inventors: Mark Andrew Hancock, Coventry; Richard Robson Cochrane, Nuneaton; John Raymond Badger, West Midlands; Colin George Woodhouse, Atherstone, all of England

[73] Assignee: Dunlop Limited, London, United Kingdom

[21] Appl. No.: 602,072

[22] Filed: Feb. 15, 1996

[30] Foreign Application Priority Data

Feb. 15, 1995 [GB] United Kingdom ............ 9502905

[51] Int. Cl.$^6$ .................. B64D 15/14; B64D 15/12
[52] U.S. Cl. .................. 244/134 D; 244/134 E; 219/202; 219/548; 219/535
[58] Field of Search .......... 244/134 R, 134 D, 244/134 E; 219/202, 528, 548, 549, 535, 437

[56] References Cited

U.S. PATENT DOCUMENTS

| | | | |
|---|---|---|---|
| 1,943,062 | 1/1934 | Driscoll | 244/134 D X |
| 2,741,692 | 4/1956 | Luke | 244/134 D X |
| 2,787,694 | 4/1957 | Farries | 244/134 D X |
| 3,204,084 | 8/1965 | Spencer, Jr. et al. | 244/134 D X |
| 3,496,331 | 2/1970 | Fleury et al. | 244/134 D X |
| 3,558,858 | 1/1971 | Luger, Jr. | |
| 3,825,371 | 7/1974 | Roder et al. | 244/134 D X |
| 5,306,897 | 4/1994 | Fraser | 219/535 |
| 5,344,696 | 9/1994 | Hastings et al. | 244/134 D X |
| 5,351,918 | 10/1994 | Giamati et al. | 244/134 D |
| 5,451,743 | 9/1995 | Du Preez | 219/528 X |
| 5,614,292 | 3/1997 | Saylor | 219/528 X |

FOREIGN PATENT DOCUMENTS

| | | | |
|---|---|---|---|
| 493431 | 6/1953 | Canada | 244/134 D |
| 727476 | 2/1966 | Canada | 244/134 D |
| 2 284 521 | 4/1976 | France. | |
| 92 03 113 | 7/1992 | Germany. | |
| 1110217 | 4/1968 | United Kingdom. | |
| 1184354 | 3/1970 | United Kingdom. | |
| 1576429 | 10/1980 | United Kingdom. | |
| 2 121 745 | 1/1984 | United Kingdom. | |
| 2 280 580 | 2/1995 | United Kingdom. | |
| WO 91/11891 | 8/1991 | WIPO. | |
| WO 92/19081 | 10/1992 | WIPO. | |
| WO 94/26590 | 11/1994 | WIPO. | |
| WO 95/15670 | 6/1995 | WIPO. | |

*Primary Examiner*—William Grant
*Attorney, Agent, or Firm*—Young & Thompson

[57] ABSTRACT

An ice protection device for an airfoil comprises a plurality of discrete mat sections which are individually secured to the structural member by an adhesive.

19 Claims, 4 Drawing Sheets

ICE PROTECTION DEVICE

This invention relates to an electrically powered ice protection device for use at locations where it is desired to inhibit the formation of ice.

The ice protection device may be of a de-icing type in which electrical heating is applied intermittently so as to shed any ice which has formed during the intervening period when the device has not been powered. The invention relates also to an anti-ice type device which is maintained in substantially continuous operation so as to tend to prevent any formation of ice, the device typically then maintaining an operating surface in a wet condition.

Ice protection devices of either of the de-icing or anti-icing type commonly are used for heating airfoils, propeller leading edges and intake duct surfaces of aircraft engines. They are used also for the vanes of wind turbines. A well established construction of an ice protection device is in the form of a mat of rubber-like electrically insulating material having electrical heater elements embedded therein, the mat being secured by bonding under heat and pressure to the material which is to be protected. Typically bonding is to the underside surface of a component formed from sheet material the other side of which is exposed to an air flow and needs protection against the potential risk of ice formation.

The resulting bonded assembly of a structural surface and heater device proves satisfactory in operation, but for logistic reasons, manufacturing difficulties may arise. Commonly the structural member, such as a propeller or engine intake, is manufactured by one specialist, whilst the manufacture of the heating element and also the bonding expertise is with another specialist. This requires in consequence that the structural member needs to be transported from its initial fabricator to the specialist who bonds the heating mat in position, and then transported either to the prime contractor or to the end user, for example, an aircraft or helicopter fabricator in the case of airfoil section or engine intake duct.

Often the airfoil section or intake duct will be of a large and/or complex, non-stackable shape. The complex shapes typically may have surfaces which are curved in cross-section as considered in each of two or more mutually perpendicular planes, that is, they are not simple, part-cylindrical surfaces. Thus, in addition to being time consuming, transportation involves the movement of thin-walled and often delicate but bulky items. The transportation requirement means that items often must be located in suitable retaining jigs prior to transportation. If a heatable mat assembly is preformed, and is supplied to the prime contractor for fitment, similar transportation problems will arise. Despite these precautions, items are prone to in-transit damage. Costs rise, not only because of the direct costs of transportation and packaging, but also because of the indirect costs arising from the downtime, when maintenance is required, and the ice protection device is not available for use, which may be several weeks and consequently the customer has to maintain a lager inventory.

Similar problems of transportation and time delay arise when an existing, fitted airfoil, intake duct or the like is required to undergo retrofitting with a heater device, or repair.

The present invention seeks to provide an improved ice protection device, ice protection assembly and method of providing ice protection in which at least some of the aforedescribed difficulties are mitigated or overcome.

In accordance with one of its aspects the present invention provides an ice assembly comprising a structural member and an electrically heatable mat assembly secured to that structural member, wherein the mat assembly comprises a plurality of discrete sections individually secured to the structural member, each heater section being secured by means of adhesive.

The individual heater mat sections may be electrically interconnected in series and/or parallel; some mat sections may be operable independently of others whereby said some mats may be operated have a heat output which is selectively variable relative to the output of other mat sections.

Mat sections may be selectively grouped for connection to respective phases of a multi-phase ac supply.

The structural member may be of a complex shape having at least in part a surface region which is curved as considered in each of at least two mutually perpendicular directions. In that case preferably the mat sections are of a selected profile such that a plurality of corresponding mat sections of that profile may be stacked together for transportation and storage, prior to being adhesively secured to a structural member.

The structural member may comprise in part a surface region of complex shape as referred to above, and a region of either planar form or of simple curvature, in which case preferably the planar and/or simple curved region has secured thereto at least one mat section which is solely of a planar and/or simple curved shape.

In the case of a mat section for fitment to a structural member surface region which is of a complex shape, the mat section preferably is formed from pre-shaped material, for example, a molded material. Preferably a mat section is pre-molded to have a shape which corresponds substantially with the shape of that portion of the structural member to which it is to be adhered.

The structural member may be of a conventional type, such as those formed from aluminum sheet, or superplastically formed titanium sheet or a composite material structure.

The present invention further provides a heater mat section pre-shaped to have a surface region of complex curvature which conforms to the shape of a surface of a structural member to which the section is to be adhered. Typically the adhesive should:

(1) maintain an adhesive bond over a temperature range corresponding to the operating temperature of the heatable mat assembly, which may be between −60° C. and +140° C.,
(2) be sufficiently flexible and resilient to accommodate differential thermal expansion between the heatable mat section and the structural member,
(3) be stable in a range of operating environments,
(4) resist attack by contaminants such as engine and transmission member lubricants and engine bay cleaning fluids.

Preferably the adhesive is a one-shot contact adhesive such as SCOTCHGRIP 1300L, manufactured by 3M Industrial Tapes and Adhesives.

The adhesive may be prior-coated on to a surface of a the heatable mat section by the mat manufacturer, be protected by release paper prior to assembly and be reactivated with a suitable solvent or by other means prior to contact with the structural member for adhesive bonding thereto.

If the mat section has to be removed the same solvent may be used to promote separation after the bonded interface is locally debonded by mechanical means.

The invention envisages a method of assembly in which masks are used over prescribed surface sections of a structural member so as to assist in accurately locating on that structural member at least a first mat section. Line markings may be applied to the surface of the structural member to which the mat section are to be adhered. By virtue of the modular nature of the heater mat assembly comprising a plurality of sections shaped as convenient, it is possible to use a strong contact-type adhesive and still achieve a positional accuracy which would not be readily achievable if, in the alternative, a conventional preformed heater mat were to be secured to the structural member in one-piece form by the use of contact adhesive rather than conventional bonding.

The mat sections are either butt jointed to one another or spaced, for example, by no more than a small gap, such as one less than 2 mm.

Neighboring edges of adjacent mat sections may be rectilinear or of a non-rectilinear type, for example, of a type curved along the length of the edge or of a toothed type. Preferably the neighboring edges have complementary shapes. Adjacent mat sections may have neighboring edges of a toothed type each comprising a plurality of projections spaced apart along the length of the respective edge and shaped and dimensioned such that the projections of one said neighboring edge lie, in the ice protection assembly, interdigitated with the projections of the other of said neighboring edges.

The interdigitated projections of a pair of confronting neighboring edges may be in the form of a comb joint whereby the interdigitation does not accurately control or keep to a minimum the spacing between the adjacent sections. Alternatively the interdigitated projections may be of a kind which creates an interlock that prevents undue separation of neighboring sections. the projections may interlock in the form of a dovetail joint.

In the case of a comb type interdigitation it is taught by the present invention that side edges of the respective projections, extending substantially perpendicular to the length of the edge of a mat section, lie in contact with or close to a corresponding side edge of a neighboring projection of an adjacent mat section thereby to ensure that, even though outward facing edges of projections may lie spaced in a manner which permits enhancement of the uniformity of heating over the projected surface area.

For a mat section having a non-rectilinear edge comprising spaced projections, preferably the mat section comprises an edge heater wire which extends locally into each or at least some of said projections.

Use may be made of mat sections having a higher intensity of heating at edge regions which neighbor another mat section thereby to ensure an adequacy of heat input to material of the structural member in the vicinity of a gap between neighboring mat sections.

The mat sections each may comprise a heater element of a kind which incorporates either a heater wire or cut foil elements in known manner.

In a modular ice protection system of the present invention and of a kind comprising both de-icing and anti-icing elements, a boundary between adjacent mat sections may be arranged substantially aligned with a boundary between said de-icing and anti-icing elements.

The whole of at least one mat section may either contain only electrical de-icing elements or contain only electrical anti-icing elements. This helps reduce the number of electrical connections in the heatable mat assembly.

The mat sections may be provided at a surface of a sheet-like structural member opposite that surface at which ice may form, or may be arranged to cover that surface of the structural member which otherwise would be exposed to a risk of ice formation. Particularly, but not exclusively, in the case of mat sections that are provided on said opposite surface, the cross-section construction of a mat section may be chosen such that the conduction of heat from the heating element to the unbonded surface of the heater mat may be inhibited, for example, by thermal insulating material, compared to the conduction of heat towards the surface of the integrated ice protection system that is exposed to the air flow. Preferably, the thickness of the thermal insulation on the unbonded side of the heating element of a mat section is greater in a section which has high thermal output rather than in one having a low thermal requirement.

Preferably heater mat sections are adhesively secured and electrically connected in a manner which enables individual mat sections subsequently to be replaced individually, for example in the event of a failure or a requirement to provide at that surface region of the structural member a different heat input level.

Embodiments of the present invention will not be described, by way of example only, with reference to the accompanying diagrammatic drawings wherein:

FIG. 1 shows a plurality of 10 of mat sections secured to part of a structural member 28.

Figure 1:
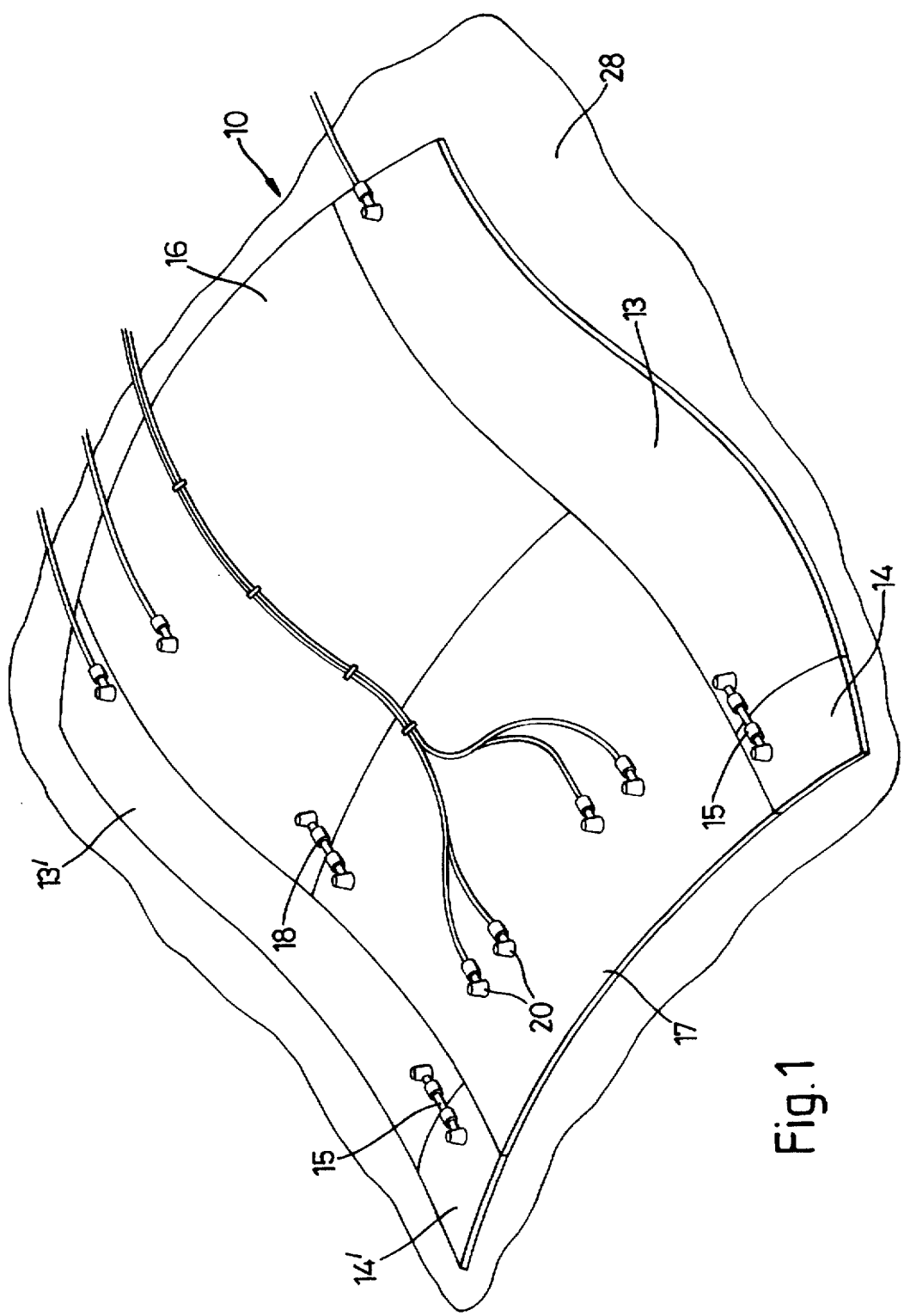
FIG. 1 is a perspective view of part of a heater mat assembly as supported by a section of a structural member.

Each of the mat sections is of a complex curvature, and neighboring sections are arranged with their respective straight or curved edges abutting in contact with one another.

Assembly comprises two pairs of side mats 13, 14; 13', 14', with the two mats of each series being interconnected by electrical connectors 15.

Similarly the central pair of mats 16, 17 are interconnected by an electrical connector 18. In this embodiment one of the mats, 17 is provided with temperature sensors 20.

The plurality mat sections are secured, by use of a contact adhesive, to an underlying layer of structural material, for example, sheet aluminum.

Figure 2:
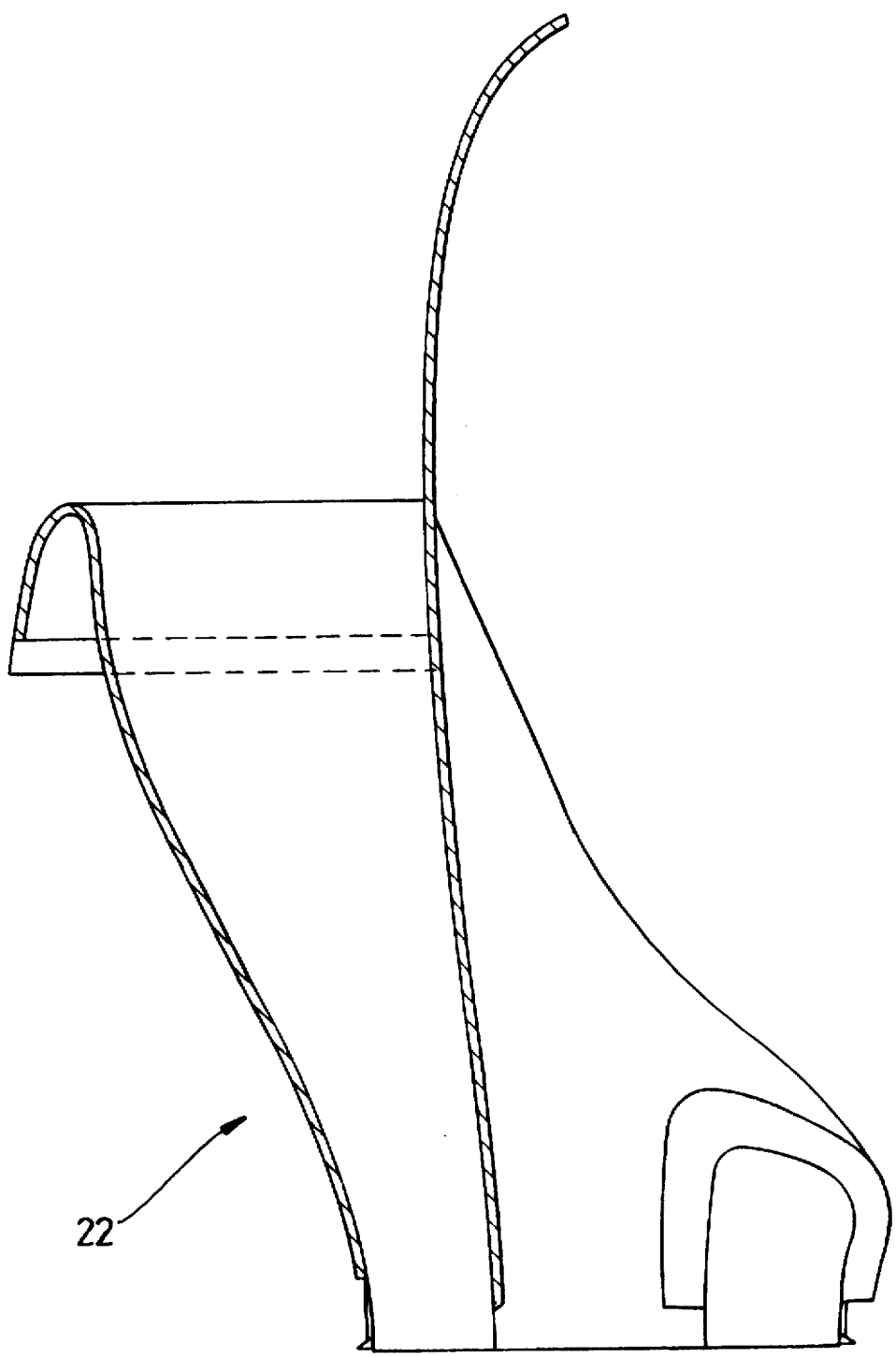
FIG. 2 is a longitudinal sectional view of part of an air intake for a helicopter engine.
Figure 3:
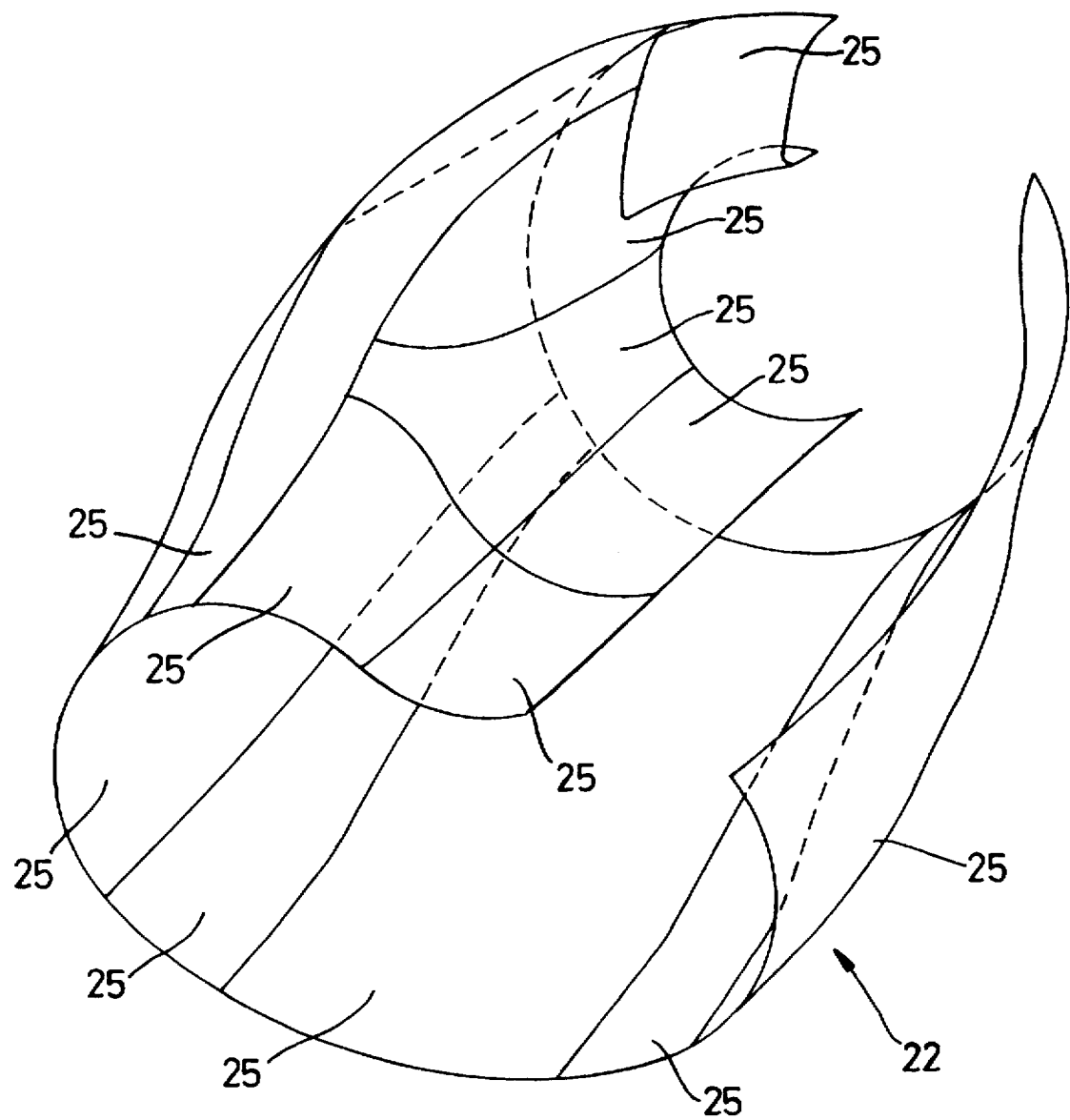
FIG. 3 is a perspective view of part of the intake of FIG. 2.

FIGS. 2 and 3 each show part of an intake duct 22 for a helicopter engine, for use in an arrangement in which a torque tube extends through the duct.

The duct is of a highly complex shape, and as shown in FIG. 3, is arranged to be covered by a plurality of mat sections 25. As also shown at FIG. 3, each mat section is of a complex curvature, but has a shape profile such that a plurality of the individual mat section 25 of corresponding type, for example, for use with a plurality of similar intake ducts 25, may be stacked together.

Figure 4:
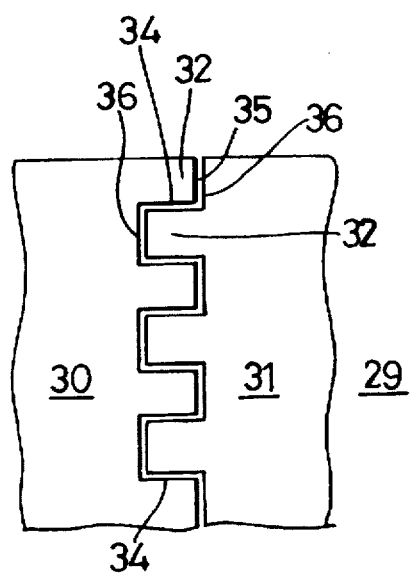
FIG. 4 is a plan view of part of a heater mat assembly at the joint between two mat sections.

FIG. 4 shows part of each of two mat sections 30, 31 (on a structural member support 29) each having a non-rectilinear edge comprising a series of projections 32 spaced apart along the direction of the length of the edge such that the projections 32 of one edge line interdigitated with those of the confronting edge of the adjacent mat section. The projections 32 are each of a rectangular shape and the spacing and dimensions of the projections are selected such that the side edges 34 of neighboring projections 32 lie in contact. In consequence, even though the outward facing edge 35 of a projection of one mat section may lie spaced from the base 36 of a recess region formed in the other, confronting non-rectilinear edge, the side edges 34 remain in close proximity or contact to facilitate avoidance of localized cold spots.

Figure 5:
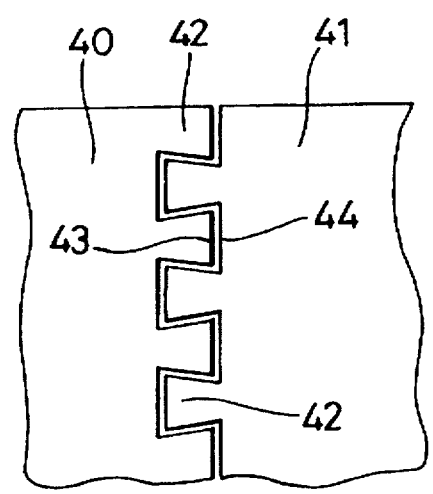
FIG. 5 shows a variation of the embodiment of FIG. 4.

The projections need not be of a rectangular shape and the invention envisages, as shown in FIG. 5 that two mat section 40, 41 may comprised non rectilinear edges formed with dovetail shaped projections 42 whereby the two sections may be locked together so that the outward facing edge 43 of each projection lies in contact with a base edge 44 between the projections 43 of the other confronting mat section, or can lie spaced from that confronting base edge by no more than a predetermined minimum distance.

Figure 6:
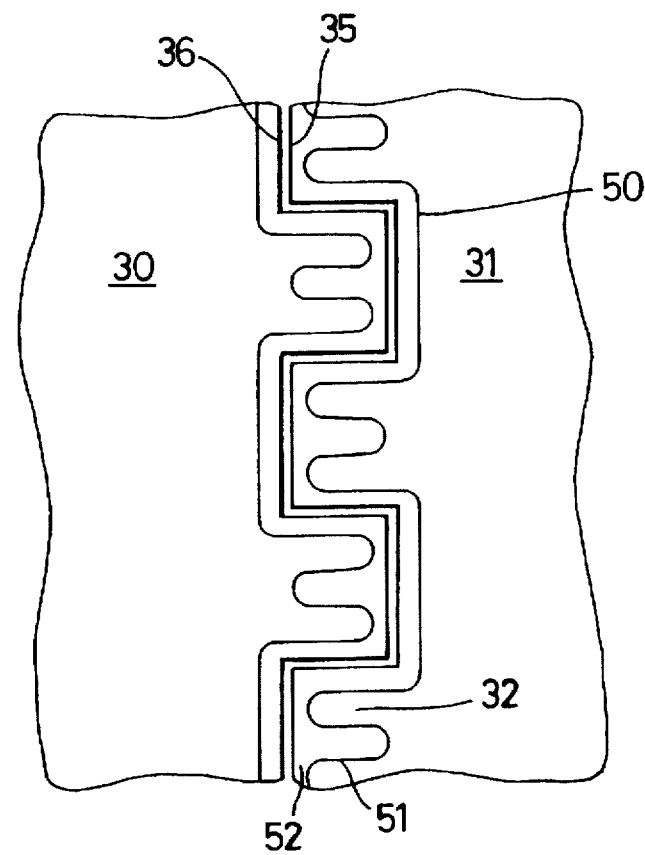
FIG. 6 shows the embodiment of FIG. 4 in more detail.

FIG. 6 shows part of the layout of heating wires 50 in the adjacent mat sections of FIG. 4 and the same feature may be applied to the dovetail projections of FIG. 5. As shown in FIG. 6, the heater wires 50 are arranged to extend along the length of a respective non-rectilinear form and comprise sections 51 which lie in the projection regions 52. In consequence, in use, the underlying (metal) support structure is more able to draw heat uniformly from the mat sections in the region of the joint between mat sections than in the case of mat sections having rectilinear edges and in respect of which the manufacturing and design restrictions on the closeness of positioning of a heater wire to an edge of a mat section creates a risk of localized cold spots.

By employing profiled edges it is no longer necessary, from the standpoint of considerations of thermal properties, to minimize the length of confronting edges of adjacent mat sections, and similarly there is removed the related preference for minimizing the number of mat sections. It is thus possible to user a larger number of mat sections. It is thus possible to use a larger number of mat sections without detriment to the de-icing or anti-icing performance, and this allows a greater flexibility in the potential standardization of the shapes of mat sections.

We claim:

1. An ice protection assembly comprising a structural member and an electrically heatable mat assembly secured to that structural member, the mat assembly comprising a plurality of discrete mat sections that are each individually secured to the structural member with a contact adhesive and that are electrically connected in at least one of parallel and series so that said plurality of discrete mat sections operate as one unit, one of said sections having an edge of non-rectilinear shape and an adjacent one of said sections having a neighboring edge at least a portion of which has a complementary non-rectilinear shape for avoiding cold spots between adjacent ones of said mat sections.

2. An ice protection assembly according to claim 1 wherein the structural member is of a complex shape having at least in part a surface region which is curved as considered in each of at least two mutually perpendicular directions.

3. An ice protection assembly according to claim 2 wherein the structural member comprises in part a surface region of said complex shape and a second region of one of a planar form and a simple curvature.

4. An ice protection assembly according to claim 3 wherein the second region has secured thereto at least one of said mat section which is solely of one of a planar and simple curved shape.

5. An ice protection assembly according to claim 2 wherein said mat sections are formed from pre-shaped material.

6. An ice protection assembly according to claim 1 wherein said mat sections are profiled such that a plurality of corresponding said mat sections of that profile may be stacked together for transportation or storage.

7. An ice protection assembly according to claim 1 wherein said mat sections are pre-molded to a shape which corresponds substantially with the shape of that portion of the structural member to which it is to be adhered.

8. An ice protection assembly according to claim 1 wherein said mat sections are butt-jointed to one another.

9. An ice protection assembly according to claim 1 wherein said mat sections are spaced apart by no more than 2 mm.

10. An ice protection assembly according to claim 1 wherein each said non-rectilinear edge comprises projections and the projections of one edge lie interdigitated with those of the neighboring edge.

11. An ice protection assembly according to claim 10 wherein said projections are interdigitated in the manner of one of a comb joint and a dovetail joint.

12. An ice protection assembly according to claim 1 wherein said mat sections each comprise a heater element which extends into said projections.

13. An ice protection assembly according to claim 1, wherein said mat sections include means for providing a higher intensity of heating at edge regions which neighbor another one of said mat sections.

14. An ice protection assembly according to claim 1, wherein each of said mat sections comprises one of de-icing and anti-icing elements.

15. An ice protection assembly for an aircraft comprising:
    an electrically heatable mat assembly for protecting an aerodynamically shaped portion of an aircraft skin from ice, said assembly comprising plural discrete mat sections that are each pre-shaped to fit a corresponding subsection of the portion of the aircraft skin to be protected and for being individually secured to the corresponding subsection of the aircraft skin with adhesive, each of said mat sections having a plurality of projections on at least two edges for meshing with corresponding ones of said projections on an adjacent one of said mat sections;
    each of said mat sections having at least one wire heater element that extends along said edges, generally parallel thereto and extending into a plurality of said projections to heat an area between adjacent said mat sections, thereby avoiding cold spots, said heater elements from said mat sections being electrically connected so that said plural discrete mat sections in said mat assembly operate as one unit.

16. The ice protection assembly of claim 15, wherein said at least one wire heater element makes at least two turns of at least 90° inside each of said plurality of projections.

17. The ice protection assembly of claim 15, wherein each of said mat sections is pre-shaped with a contour to permit plural said mat sections for the same corresponding subsection to be nested in parallel.

18. The ice protection assembly of claim 15, wherein each of said mat sections is separately replaceable.

19. The ice protection assembly of claim 15, wherein at least one of said mat sections comprises a temperature sensor.

* * * * *